(12) United States Patent
Weber et al.

(10) Patent No.: US 10,588,411 B2
(45) Date of Patent: Mar. 17, 2020

(54) ANTI-WALKING ASSEMBLY FOR VIBRATING AND SLIDING STRUCTURES

(71) Applicant: KaBob Enterprises LLC, State College, PA (US)

(72) Inventors: Karl R. Weber, State College, PA (US); Robert C. Hegedus, Jr., Bellefonte, PA (US)

(73) Assignee: KABOB ENTERPRISES LLC, State College, PA (US)

( * ) Notice: Subject to any disclaimer, the term of this patent is extended or adjusted under 35 U.S.C. 154(b) by 0 days.

(21) Appl. No.: 15/936,126

(22) Filed: Mar. 26, 2018

(65) Prior Publication Data

US 2018/0271278 A1   Sep. 27, 2018

Related U.S. Application Data

(60) Provisional application No. 62/476,311, filed on Mar. 24, 2017.

(51) Int. Cl.
   *A47B 91/08*   (2006.01)
   *D06F 39/12*   (2006.01)
   *F16B 3/00*    (2006.01)

(52) U.S. Cl.
   CPC ............ *A47B 91/08* (2013.01); *D06F 39/125* (2013.01); *F16B 3/00* (2013.01)

(58) Field of Classification Search
   USPC .................... 248/677, 673, 188.8, 188.9, 551
   See application file for complete search history.

(56) References Cited

U.S. PATENT DOCUMENTS

| | | |
|---|---|---|
| 1,948,879 A | 2/1934 | Green |
| D238,038 S | 12/1975 | Turco |
| 4,530,173 A | 7/1985 | Jesinsky, Jr. |
| 4,634,144 A * | 1/1987 | Ringe ...................... B60S 9/02 |
| | | 16/42 T |

(Continued)

FOREIGN PATENT DOCUMENTS

| | | |
|---|---|---|
| CN | 101798742 A | 8/2010 |
| CN | 202184833 U | 4/2012 |

(Continued)

OTHER PUBLICATIONS

DH Gate, "Gel Cushion U Shape Heel Insole Shoe Pad for Achilles Tendinitis Heel Pain Ease", http://www.dhgate.com/store/product/s-m-l-size-gel-cushion-u-shape-heel-insole/179774029.html, Feb. 12, 2014 (1 page).

(Continued)

*Primary Examiner* — Alfred J Wujciak
(74) *Attorney, Agent, or Firm* — Oliff PLC

(57) ABSTRACT

An assembly configured to limit movement of an apparatus having a base that rests on a surface includes a body member and a gate. The body member is configured to be secured to the surface and has an opening configured to receive the base of the apparatus. The gate is configured to be removably coupled with the body member to open and close the opening. When the gate is coupled with the body member, the gate is configured to cooperate with the body member to limit movement of the base of the apparatus relative to the surface in directions that are parallel to the surface.

16 Claims, 6 Drawing Sheets

(56) References Cited

U.S. PATENT DOCUMENTS

| | | | | |
|---|---|---|---|---|
| 5,308,036 A | * | 5/1994 | Olson | F16F 15/04 |
| | | | | 188/321.11 |
| 5,842,294 A | | 12/1998 | Fabricant | |
| D414,024 S | | 9/1999 | Kress et al. | |
| 6,052,856 A | | 4/2000 | DeMoya et al. | |
| 6,409,129 B1 | * | 6/2002 | Chen | A47B 91/00 |
| | | | | 248/188.8 |
| D673,279 S | | 12/2012 | Huttner | |
| D690,019 S | | 9/2013 | Nichols | |
| 9,255,356 B2 | * | 2/2016 | Cheon | D06F 39/125 |
| 9,405,264 B2 | * | 8/2016 | Ishiwata | A47B 91/08 |
| 10,088,094 B2 | * | 10/2018 | Craig | F16M 7/00 |
| 2014/0317955 A1 | | 10/2014 | Levine | |

FOREIGN PATENT DOCUMENTS

| | | |
|---|---|---|
| CN | 202273110 U | 6/2012 |
| CN | 205223650 U | 5/2016 |
| CN | 205275973 U | 6/2016 |
| EP | D323611 A3 | 7/1990 |
| FR | 1397826 A | 4/1965 |

OTHER PUBLICATIONS

Heal that Pain, "Heel That Pain with HTP Heel Seats", https://heelthatpain.com/treatments/htp-heel-seats, Feb. 19, 2014 (3 pages).

My Foot Shop, "Horseshoe Heel Spur Pads", http://www.myfootshop.com/horseshoe-heel-spur-pads, Jul. 30, 2016 (1 page).

Ownta, "Shine Health Care Bone Spur Heel Rehabilitation Arch Support Foot Pad", https://www.ownta.com/shine-health-care-bone-spur-heel-rehabilitation-arch-support-foot-pad.html, Jul. 27, 2011 (1 page).

MD Buying Group, "Metatarsal U Pad #105 nAdhesive Backed, Foam 1/8", http://mdbuyinggroup.com/products/podiatrist-wholesale/metatarsal-u-pad-105-adhesive-backed-foam-18, Jun. 15, 2008 (1 page).

* cited by examiner

ANTI-WALKING ASSEMBLY FOR VIBRATING AND SLIDING STRUCTURES

CROSS-REFERENCE TO RELATED APPLICATION

This nonprovisional application claims the benefit of U.S. Provisional Application No. 62/476,311, filed Mar. 24, 2017, the contents of which are incorporated herein by reference.

BACKGROUND

Conventional washing machines and drying machines have a drum or cylinder that spins during use. The spinning drum causes the machine to vibrate. In situations where the machine is situated on a floor having a surface such as vinyl, tile, hardwood, or the like, the vibration may cause the machine to undesirably slide or "walk" from its original position to a new position.

Also, in homes where rooms have a floor with a surface such as vinyl, tile, hardwood, or the like, furniture may undesirably slide or "walk" from its original position to a new position when users sit on furniture or get off the furniture.

Further, in conventional industrial applications, vibrating machinery such as tumblers may undesirably slide or "walk" along a surface during use.

It may be desirable to provide an assembly that prevents vibrating and sliding structures from undesirably moving or "walking" from their original position to a new position during normal use.

SUMMARY

According to various aspects of the disclosure, an assembly configured to limit movement of an apparatus having a base that rests on a surface includes a body member and a gate. The body member is configured to be secured to the surface and has an opening configured to receive the base of the apparatus. The gate is configured to be removably coupled with the body member to open and close the opening. When the gate is coupled with the body member, the gate is configured to cooperate with the body member to limit movement of the base of the apparatus relative to the surface in directions that are parallel to the surface.

In some aspects, the gate is configured to cooperate with the body member to limit movement of the base of the apparatus relative to the surface in all directions that are parallel to the surface.

According to various aspects, the body member includes a pair of opposed walls that extend from a wall of the body member to the cavity to define the opening to the cavity. In some aspects, the body member includes a pair of opposed notches in the pair of walls, and the notches are configured to receive opposite end portions of the gate and to prevent the gate from moving in a direction away from the cavity.

In various aspects, the opening to the cavity is configured to receive the base of the apparatus as the base is moved relative to the body member in a first direction parallel to the surface.

According to some aspects, the assembly includes an adhesive on a bottom surface of the body member, and the adhesive is configured to fixedly attach the body member to the surface.

In accordance with various aspects of the disclosure, an anti-walking assembly includes a body member having an outer wall and a removable gate configured to be positioned in the body member. The outer wall has a cutout defined by (i) first and second arms, and (ii) first and second inner walls which oppose each other and which extend from the first and second arms to a cavity, respectively. The first inner wall and the first arm meet to form a first notch, and the second inner wall and the second arm meet to form a second notch opposing the first notch. The removable gate has first and second end portions which are configured to be positioned in the first and second notches, respectively, such that the removable gate closes the cutout to define the cavity.

In some aspects, the removable gate extends from inner surfaces of the first and second arms toward the cavity when positioned in the body member. According to various aspects, the removable gate extends from the inner surfaces of the first and second arms to only a portion of the first and second walls. In various aspects, the portion of the first and second walls is not coplanar with the remainder of the first and second walls.

According to some aspects, the first and second arms have outermost surfaces coplanar with the first side, and the outermost surfaces are disposed further outward than outermost surfaces of the removable gate relative to a center of the body member.

In various aspects, the first and second arms extend from the first and seconds notches, respectively, toward a center of the first side.

In accordance with various aspects of the disclosure, a method of limiting movement of an apparatus having a base that rests on a surface includes (i) securing a body member to the surface; (ii) with a gate uncoupled from the body member, moving the base through an opening in a wall of the body member into a cavity of the body member; and (iii) coupling the gate with the body member to close the opening to the cavity, thereby limiting movement of the base of the apparatus relative to the surface in directions that are parallel to the surface.

According to some aspects, the includes removing the gate from the body member to open the opening to the cavity, and moving the base of the apparatus relative to the surface in a first direction from the cavity through the opening, the first direction being parallel to the surface.

DETAILED DESCRIPTION OF EMBODIMENTS

Figure 1:
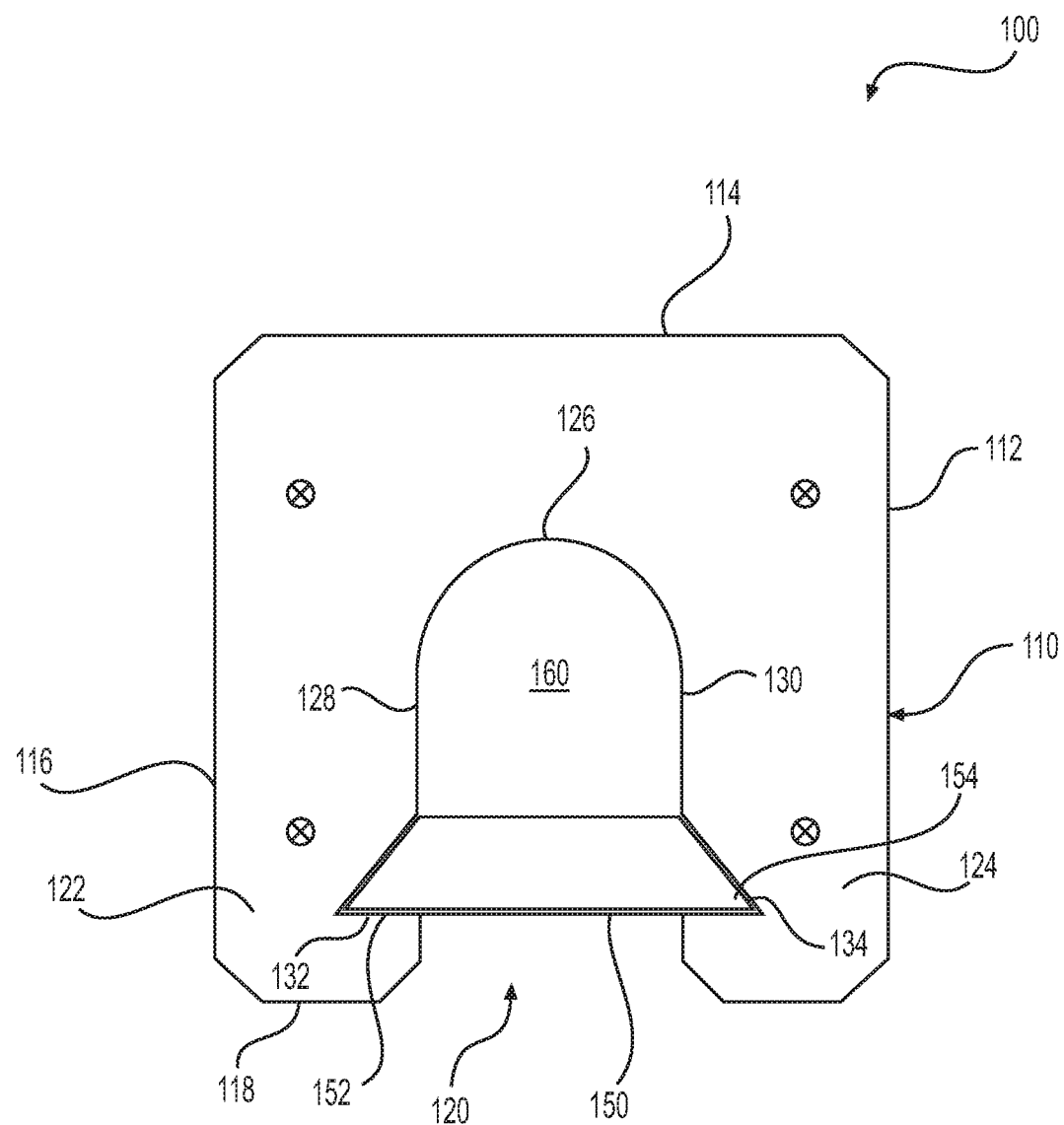
FIG. 1 is a plan view of an exemplary anti-walking assembly for vibrating and sliding structures in accordance with various aspects of the disclosure illustrated in an assembled configuration.
Figure 2:
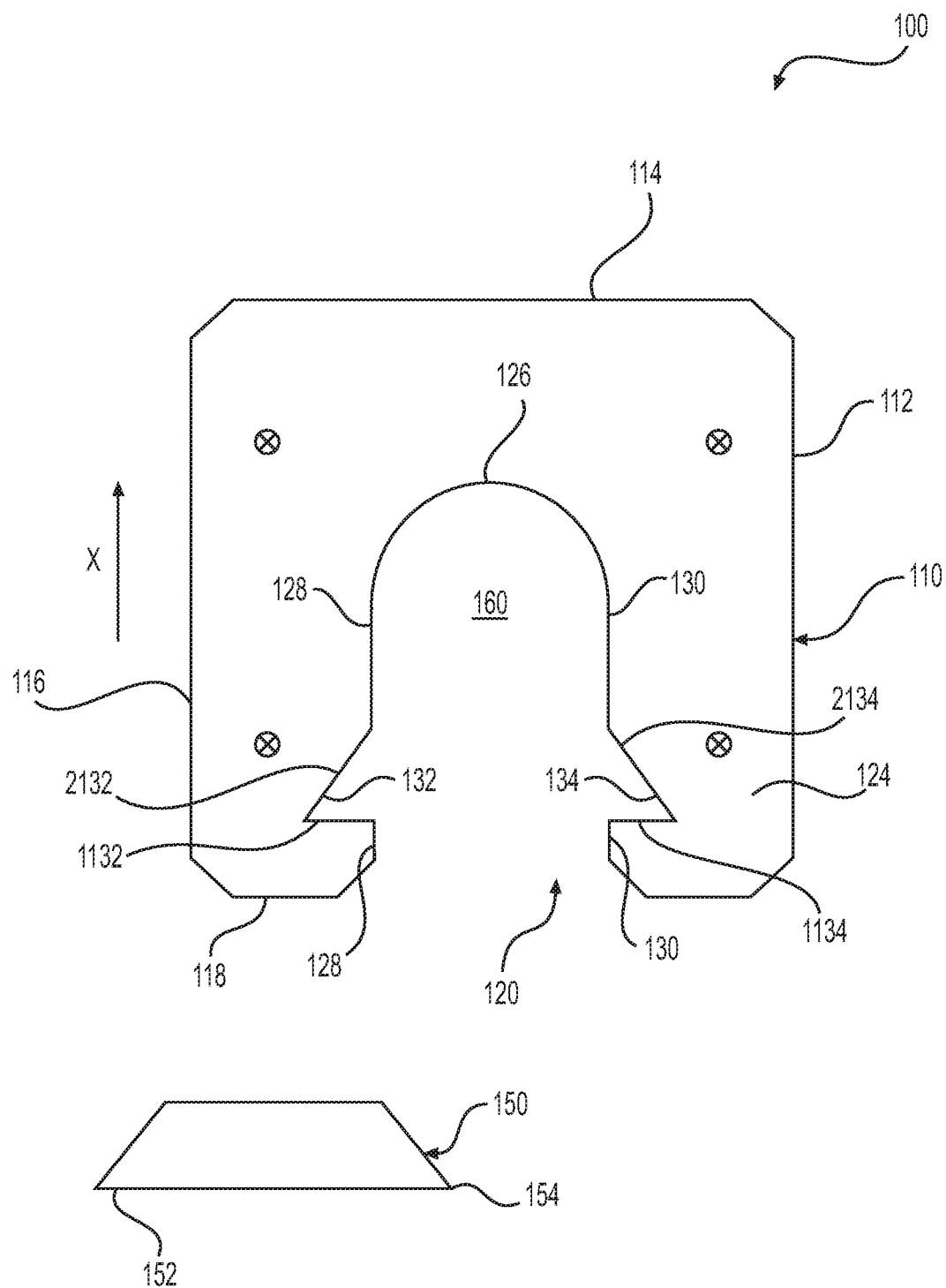
FIG. 2 is an exploded view of the exemplary anti-walking assembly of FIG. 1 illustrated in a disassembled configuration.
Figure 3:
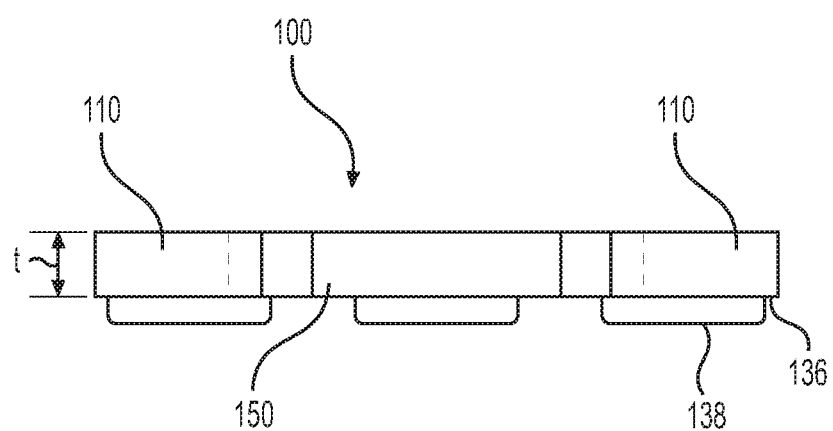
FIG. 3 is a side view of the body member of the exemplary anti-walking assembly of FIG. 1.

FIGS. 1-3 illustrate an exemplary anti-walking assembly 100 according to various aspects of the disclosure. The exemplary anti-walking assembly 100 may include a body member 110 and a removable gate 150. As shown in FIG. 1, when the body member 110 and the removable gate 150 are assembled together, the assembly 100 includes a cavity 160 cooperatively defined by the body member 110 and the removable gate 150. The body member 110 includes a mechanism for securing the body member 110 to a surface such as a floor. For example, according to various aspects of the disclosure, a bottom surface 136 of the body member 110 may include an optional adhesive 138 (shown in broken lines), such as for example a strip of two-sided tape or the like. It should be appreciated that the body member 110 may be secured to the floor by any securing means, provided that the securing means has a securement strength sufficient to withstand the vibration or sliding of a vibrating or sliding structure and to remain secured to the floor.

According to some aspects of the disclosure, the body member 110 may, in addition to or as an alternative to the adhesive, include two or more anchor holes 170 that are configured to receive an anchor member (not shown), such as for example a screw, which may be used to secure the body member 110 to a floor. In some aspects, it may be desirable to provide the body member 110 with four anchor holes 170 that are positioned on the body member 110 so that the anti-walking assembly 100 can be used on the left or right and the front or back legs of a machine or furniture item and the anchor members in at least two or three of the anchor holes 170 can be accessed while a foot or leg of the machine or furniture is in the cavity 160. Although FIGS. 1 and 2 illustrate an exemplary embodiment having four anchor holes 170, it should be appreciated that at least two anchor members should be used in order to prevent the body member from pivoting about a single anchor point. Furthermore, while two anchor members may be sufficient in many applications, for furniture and/or industrial applications, it may be preferable to provide more than two anchor members.

Figure 4:
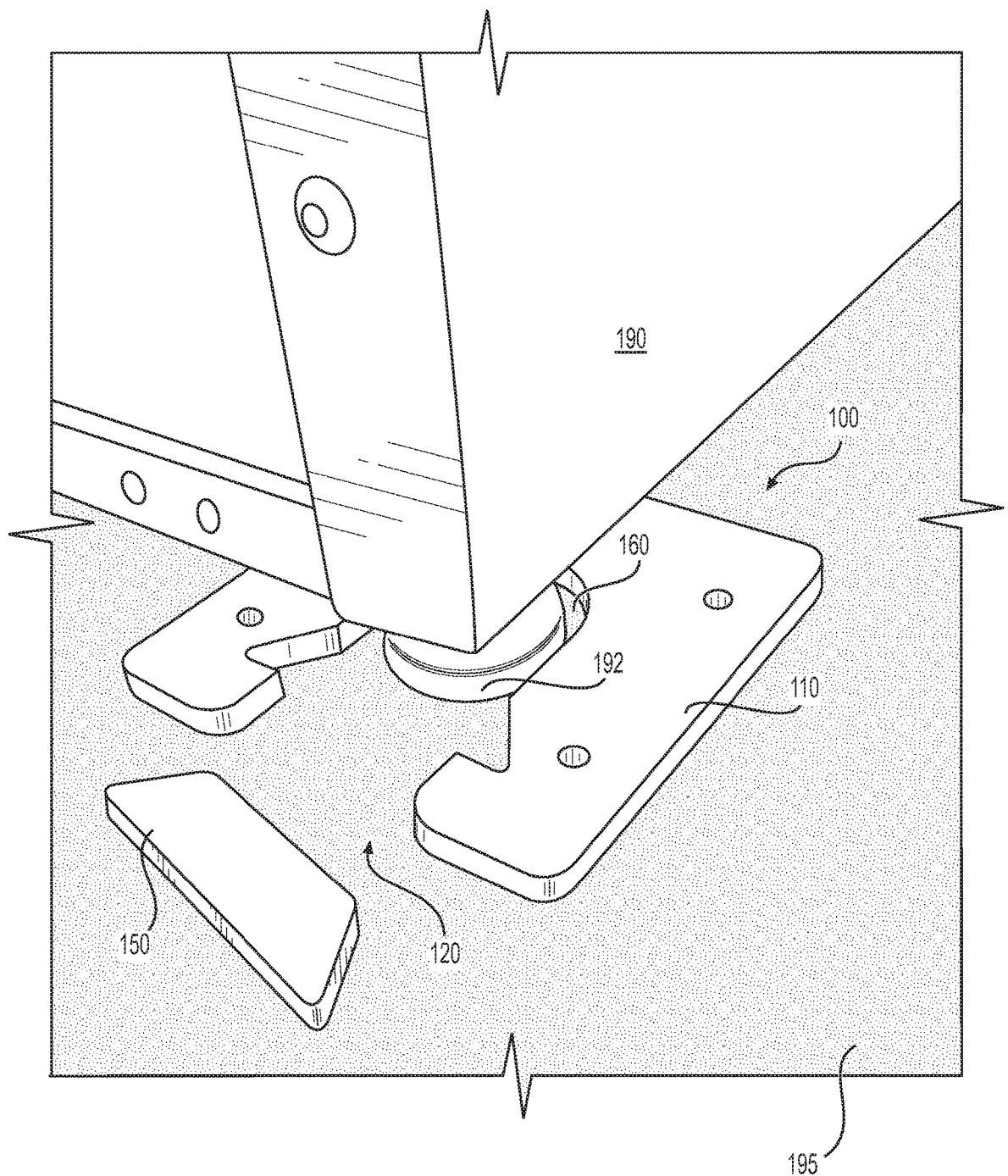
FIG. 4 is a perspective view illustrating the exemplary anti-walking assembly of FIG. 1 during installation of a base of an apparatus.
Figure 5:
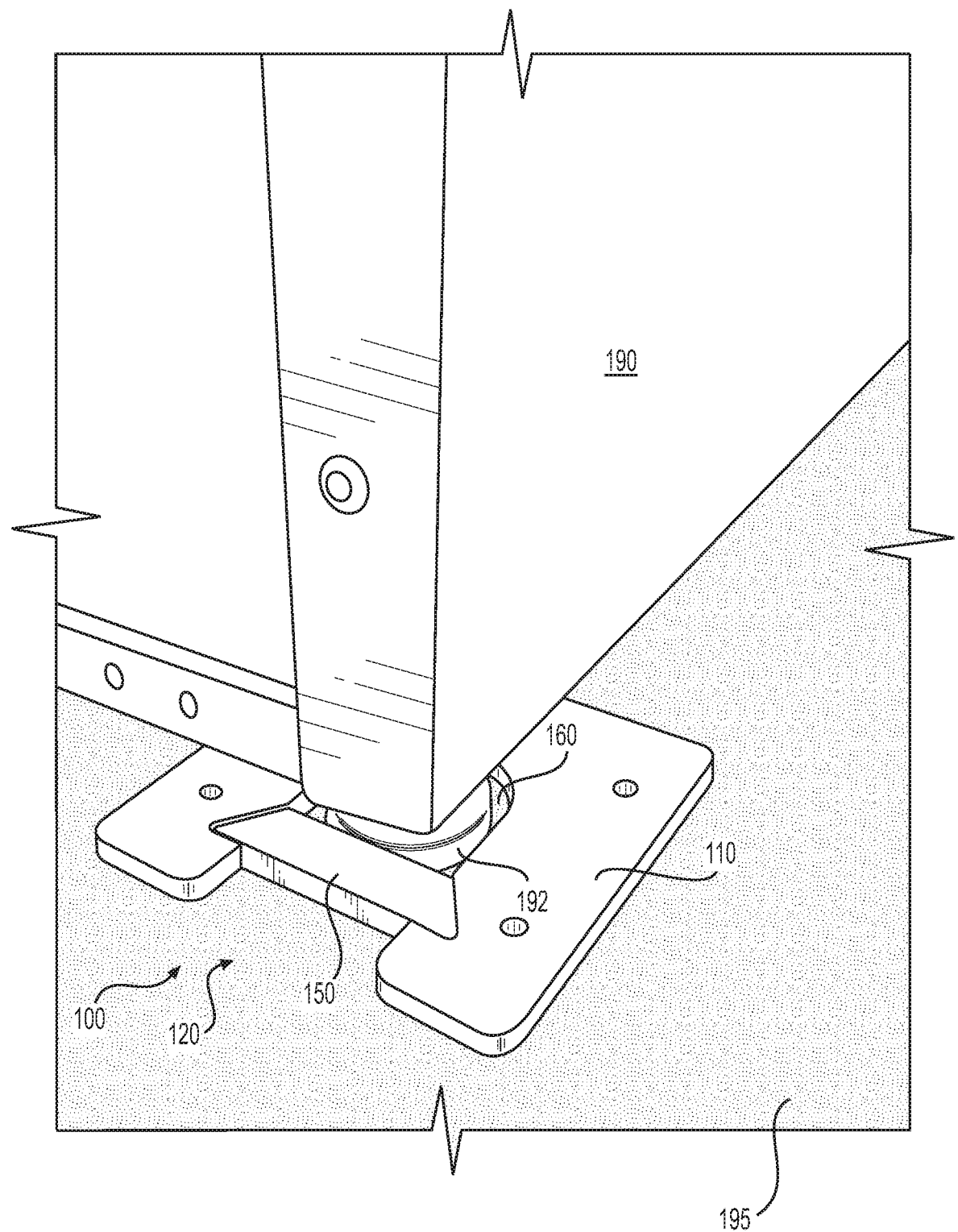
FIG. 5 illustrates the exemplary anti-walking assembly of FIG. 1 after installation of a base of an apparatus.
Figure 6:
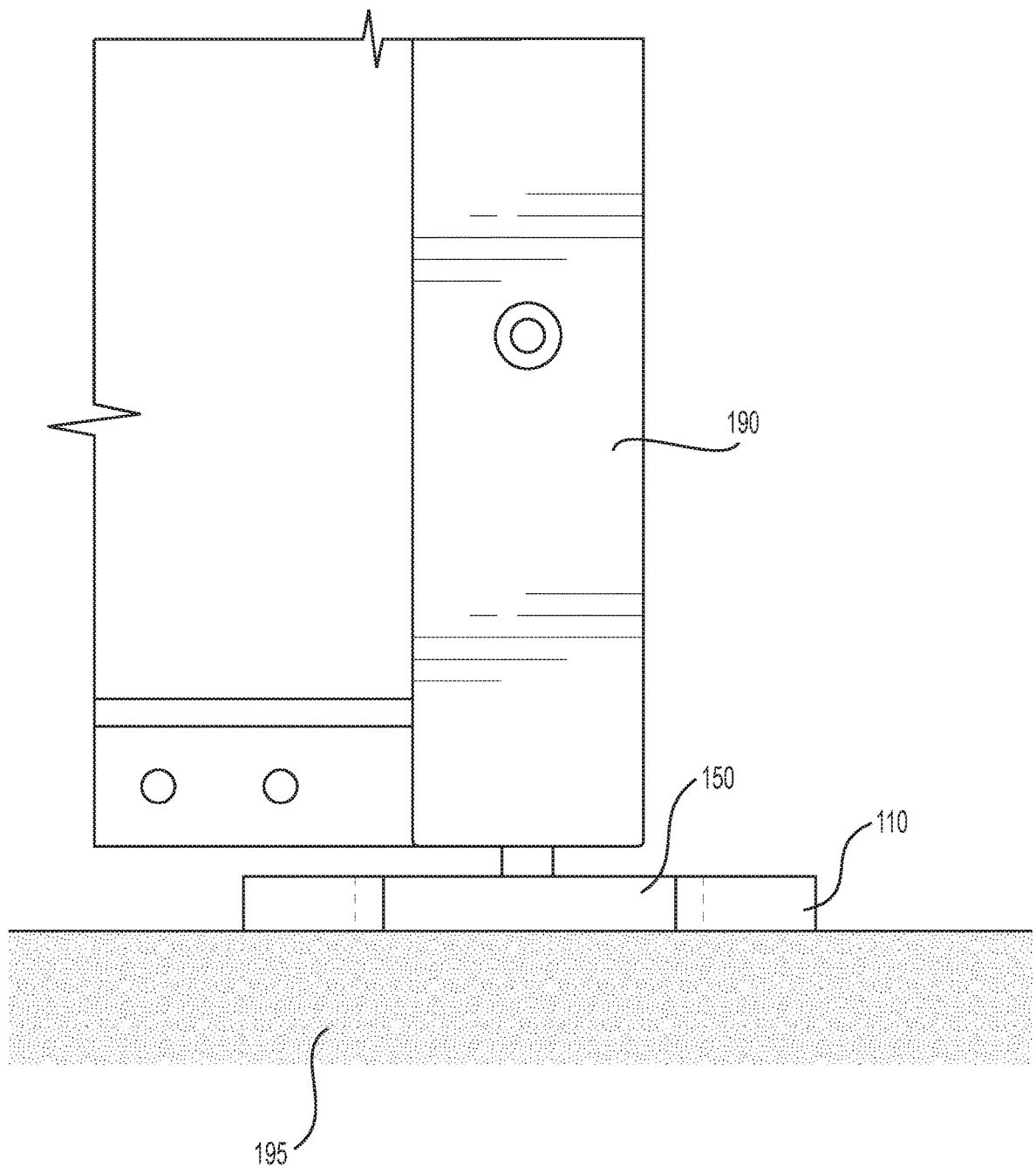
FIG. 6 illustrates a side view of the exemplary anti-walking assembly of FIG. 1 after installation of a base of an apparatus.

In the exemplary embodiment illustrated in FIGS. 1 and 2, the body member 110 is substantially square-shaped, with four sides 112, 114, 116, 118. As shown in FIGS. 1 and 2, is some embodiments, the four sides 112, 114, 116, 118 may include tapered corners for aesthetic and/or functional reasons. As shown in FIGS. 4 and 5, in some embodiments, the four sides 112, 114, 116, 118 may include rounded corners for aesthetic and/or functional reasons. Three sides 112, 114, 116 of the body member 110 block access to the cavity 160, while a fourth one 118 of the four sides of the body member 110 includes an opening 120 extending in a first direction X from the fourth side 118 to the cavity 160. The opening 120 and the cavity 160 extend through the thickness t of the body member 110, as best shown in FIG. 3. The opening 120 may be defined by a pair of walls 128, 130 that extend substantially parallel to one another and, in some aspects, to the first and third sides 112, 116. The opening 120 may include a curved portion 126 that connects the pair of walls 128, 130, which extend from the fourth side 118 toward the second side 114, to form a U-shaped cutout. It should be appreciated that in some embodiments, the curved portion 126 can be any other shape such as, for example, a straight portion that intersects with the walls 128, 230.

Each of the walls 128, 130 includes a notch 132, 134, for example, a V-shaped notch. The notches 132, 134 are opposed to one another on opposite sides of the opening 120. Referring to FIGS. 1 and 2, in some embodiments, each of the notches 132, 134 includes a shoulder portion 1132, 1134 that extends perpendicular to the respective wall 128, 130 and a tapered portion 2132, 2134 that extends from the respective shoulder portion 1132, 1134 to the respective wall 128, 130. The notches 132, 134 may form two opposed arms 122, 124 on opposite sides of the opening 120 when viewed from the top or the bottom of the body member 110.

As shown in FIGS. 1 and 2, the gate 150 may be trapezoid-shaped with opposing ends 152, 154 each having a shape that is complementary to the shape of the notches 132, 134, and the notches 132, 134 are configured to removably receive the opposing ends 152, 154 of the gate 150. The notches 132, 134 shown in FIG. 1 are V-shaped, but the pair of walls 128, 130 may include notches having other shapes, for example, square, rectangular, or the like, as long as the notches 132, 134 are configured to securely retain the gate 150 such that the gate 150 is prevented from moving in a direction opposite to the first direction X when the opposing ends 152, 154 are received by the notches 132, 134. In some aspects, as illustrated in FIGS. 1-6, the notches 132, 134 are configured to securely retain the gate 150 such that the gate 150 is prevented from moving in the first direction X and in a direction opposite to the first direction X when the opposing ends 152, 154 are received by the notches 132, 134.

When the gate 150 is positioned with its opposing ends 152, 154 in the notches 132, 134, the gate 150 extends across the opening 120 to form a closed cavity 160. That is, the opening 120 to the cavity 160 is closed by the gate 150. It should be understood that the gate 150, the curved portion 126, and the pair of walls 128, 130 may have any shape, provided that the gate 150, the curved portion 126, and the pair of walls 128, 130 cooperate to define a closed cavity 160 sized and configured to receive a base 192 (e.g., a foot or leg) of an apparatus 190 that rests on a floor or other ground surface 195, as shown in FIGS. 3-6.

It should be appreciated that in various embodiments the body member 110 itself may be rectangular, circular, or any other shape. In the event that the body member is not square or rectangular, an opening similar to the opening 120 can extend inward from any region along an outer periphery of the body member toward the cavity 160. Otherwise, the opening and the gate member for such an embodiment would be similar to those discussed above in connection with FIGS. 1-6.

In use, the body member 110 may be fixedly attached to a floor or other surface 195, for example, via the adhesive 138 and/or anchor members, at a location where a user desires to position the apparatus 190. The apparatus 190 may be an apparatus that vibrates and/or moves during use, such as for example, a washer or a dryer; furniture that sits on a low friction floor or surface; industrial machinery; or the like. The body member 110 may be particularly placed where a base 192 of the apparatus 190 rests on the floor or surface 195. In some aspects, a plurality of body members 110 may be fixedly attached to the floor 195 such that each body member 110 is placed in a position that corresponds to a position where it is desired to rest one of a plurality of bases 192 of the apparatus 190 on the floor 195.

Once the body member 110 is securely fixed to the floor 195, the base 192 of the apparatus 190 is moved (for example, by sliding and/or lifting) into the opening 120 and toward the cavity 160. The base 192 is moved relative to the body member 110 until positioned within the cavity 160 such that the gate 150 can be placed in the notches 132, 134 of the side walls 128, 130. The gate 150 is then coupled with the body member 110 by placing the opposing ends 152, 154 of the gate 150 in the notches 132, 134 in the walls 128, 130 of the body member 110. The base of the vibrating or sliding apparatus is then disposed in the closed cavity 160. When the gate 150 is coupled with the body member 110, the gate 150 cooperates with the body member 110 to limit movement of the base 192 of the apparatus 190 to the area defined by the cavity 160. Particularly, the gate 150 and the body member 110 limit the base 192 (and thus the apparatus 190) to movement relative to the floor or surface 195 in all directions that are parallel to the floor or surface 195. That is, the gate 150 and the body member 110 limit movement of the base 192 parallel to the floor or surface 195 in the first direction X, a direction opposite to the first direction X, and any direction that is transverse to the first direction X through 360°.

It should be appreciated that the body member 110 and the removable gate 150 have a thickness that is less than a clearance between the floor and a body of the apparatus so as to allow the base of the apparatus to rest on the floor. Also, the clearance between a top of the body member 110 and a bottom of the apparatus 190 should be large enough to permit the gate 150 to be uncoupled from the body member 110 (i.e., removed from the notches 132, 134) and passed between the body member 110 and the apparatus 190. Further, in the event that the apparatus 190 includes an adjustment member (e.g., a leveling nut or the like; not shown) for leveling and/or balancing the bases 192 of the apparatus 190 on the floor or surface 195, the clearance should also be sufficient to allow a user to access the adjustment member with a hand or a tool in order to effectuate the adjustment.

When a user desires to move the vibrating or sliding structure for purposes of cleaning, repair, etc., the user removes the gate 150 from the body member 110. The vibrating or sliding apparatus 190 can then be slid from the opening 120 without lifting the apparatus 190. Once the cleaning or repair is complete, the vibrating or sliding apparatus 190 is moved back into the cavity 160 (e.g., through the opening 120), and the opposing ends 152, 154 of the removable gate 150 are replaced in the notches 132, 134 of the walls 128, 130 of the body member 110 to close the cavity 160.

It should be appreciated that in some aspects, the body member 110, without the gate 150, can be placed on a floor adjacent the base 192 (e.g., a foot or leg) of a washing machine, drying machine, or furniture by moving (e.g., by sliding and lifting) the opening 120 past the base 192 until the base 192 is in the cavity 160, and then securely fixing the body member 110 to the floor 190. The gate 150 is then coupled with the body member 110 by placing the opposing ends 152, 154 of the gate 150 in the notches 132, 134 in the walls 128, 130 of the body member 110. The base of the vibrating or sliding apparatus 190 is then disposed in the closed cavity 160. The securing means should have a securement strength sufficient to withstand the vibration or sliding of a vibrating or sliding apparatus 190 and to remain secured to the floor 195. As described above, the securing means may include, for example, an adhesive, or an anchoring member, such as for example a screw.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. An assembly configured to limit movement of a base of an apparatus that rests on a surface, comprising:
    a body member configured to be secured to the surface and having a cavity, the cavity being configured to receive the base of the apparatus and permit the base of the apparatus to contact the surface; and
    a gate configured to be removably coupled with the body member to open and close an opening to the cavity,
    wherein, when the gate is coupled with the body member, the gate is configured to cooperate with the body member to limit movement of the base of the apparatus relative to the surface in directions that are parallel to the surface,
    wherein the body member includes two walls that extend from a wall of the body member to the cavity and face one another to define the opening to the cavity, and
    wherein the body member includes a notch in each of the two walls, the notches being configured to receive opposite end portions of the gate and to prevent the gate from moving in a direction away from the cavity.

2. The assembly of claim 1, wherein the gate is configured to cooperate with the body member to limit movement of the base of the apparatus relative to the surface in all directions that are parallel to the surface.

3. The assembly of claim 1, wherein the two wall include a pair of opposed walls.

4. The assembly of claim 3, wherein the notches include a pair of opposed notches in the pair of walls.

5. The assembly of claim 1, wherein the opening to the cavity is configured to receive the base of the apparatus as the base is moved relative to the body member in a first direction parallel to the surface.

6. The assembly of claim 1, further comprising an adhesive on a bottom surface of the body member, the adhesive being configured to fixedly attach the body member to the surface.

7. An anti-walking assembly for limiting movement of a leg of apparatus, comprising:
    a body member having an outer wall; and
    a removable gate configured to be positioned in the body member, wherein
    the outer wall has a cutout defined by (i) first and second arms, and (ii) first and second inner walls which oppose each other and which extend from the first and second arms to a cavity, respectively, the first inner wall and the first arm meet to form a first notch, and the second inner wall and the second arm meet to form a second notch opposing the first notch, and the removable gate has first and second end portions which are configured to be positioned in the first and second notches, respectively, such that the removable gate closes the cutout to define the cavity.

8. The anti-walking assembly according to claim 7, wherein the removable gate extends from inner surfaces of the first and second arms toward the cavity when positioned in the body member.

9. The anti-walking assembly according to claim 8, wherein the removable gate extends from the inner surfaces of the first and second arms to only a portion of the first and second walls.

10. The anti-walking assembly according to claim 9, wherein the portion of the first and second walls is not coplanar with the remainder of the first and second walls.

11. The anti-walking assembly according to claim 7, wherein the first and second arms have outermost surfaces coplanar with the first side, and the outermost surfaces are disposed further outward than outermost surfaces of the removable gate relative to a center of the body member.

12. The anti-walking assembly according to claim 7, wherein the first and second arms extend from the first and seconds notches, respectively, toward a center of the first side.

13. An assembly configured to limit movement of a base of an apparatus that rests on a surface, comprising:

a body member configured to be secured to the surface and having a cavity configured to receive the base of the apparatus; and a gate configured to be removably coupled with the body member to open and close an opening to the cavity, wherein the body member includes a pair of opposed walls that extend from a wall of the body member to the cavity to define the opening to the cavity, and a pair of opposed notches in the pair of walls, the notches being configured to receive opposite end portions of the gate and to prevent the gate from moving in a direction away from the cavity, and wherein, when the gate is coupled with the body member, the gate is configured to cooperate with the body member to limit movement of the base of the apparatus relative to the surface in directions that are parallel to the surface.

14. The assembly of claim 13, wherein the gate is configured to cooperate with the body member to limit movement of the base of the apparatus relative to the surface in all directions that are parallel to the surface.

15. The assembly of claim 13, wherein the opening to the cavity is configured to receive the base of the apparatus as the base is moved relative to the body member in a first direction parallel to the surface.

16. The assembly of claim 13, further comprising an adhesive on a bottom surface of the body member, the adhesive being configured to fixedly attach the body member to the surface.

\* \* \* \* \*